(12) United States Patent  (10) Patent No.: US 9,417,744 B2
Yang et al.  (45) Date of Patent: Aug. 16, 2016

(54) TOUCH INPUT DEVICE, MANUFACTURING METHOD THEREOF, AND TOUCH DETECTING METHOD

(71) Applicant: Wistron Corporation, New Taipei (TW)

(72) Inventors: Sweehan J. H. Yang, New Taipei (TW); Tung-Yang Tang, New Taipei (TW); Wen-Hua Chang, New Taipei (TW); Yong-Yu Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 88 days.

(21) Appl. No.: 14/246,138

(22) Filed: Apr. 6, 2014

(65) Prior Publication Data

US 2015/0193043 A1 Jul. 9, 2015

(30) Foreign Application Priority Data

Jan. 6, 2014 (TW) .............................. 103100397 A

(51) Int. Cl.
*G06F 1/00* (2006.01)
*G06F 3/044* (2006.01)
*G06F 3/041* (2006.01)
*G06F 1/16* (2006.01)

(52) U.S. Cl.
CPC ................ *G06F 3/044* (2013.01); *G06F 1/169* (2013.01); *G06F 3/0414* (2013.01); *G06F 3/0416* (2013.01); *G06F 2203/04105* (2013.01)

(58) Field of Classification Search
CPC .................................. G01L 11/00; G01L 1/16
See application file for complete search history.

(56) References Cited

U.S. PATENT DOCUMENTS

| 2013/0120257 A1* | 5/2013 | Park ........................ G06F 3/041 345/158 |
| 2015/0014796 A1* | 1/2015 | Dehe ..................... B81B 7/0016 257/416 |
| 2015/0062452 A1 | 3/2015 | Shih et al. |

FOREIGN PATENT DOCUMENTS

TW 201516813 5/2015

OTHER PUBLICATIONS

"Office Action of Taiwan Counterpart Application", issued on Jul. 7, 2015, with English translation thereof, p. 1-p. 8.

* cited by examiner

*Primary Examiner* — Michael Faragalla
(74) *Attorney, Agent, or Firm* — Jianq Chyun IP Office

(57) ABSTRACT

A touch input device including a carrying board, a plurality of first electrode pads, and a plurality of conductive lines is provided. The carrying board includes a plurality of cantilever portions and a plurality of connecting portions. The connecting portions are respectively connected to the cantilever portions. The first electrode pads are respectively disposed on the cantilever portions and configured to sense capacitance variation due to an object approaching or touching the carrying board. The conductive lines extend on the connecting portions and are respectively connected to the first electrode pads. A manufacturing method of a touch input device and a touch sensing method are also provided.

11 Claims, 6 Drawing Sheets

TOUCH INPUT DEVICE, MANUFACTURING METHOD THEREOF, AND TOUCH DETECTING METHOD

CROSS-REFERENCE TO RELATED APPLICATION

This application claims the priority benefit of Taiwan application serial no. 103100397, filed on Jan. 6, 2014. The entirety of the above-mentioned patent application is hereby incorporated by reference herein and made a part of this specification.

BACKGROUND OF THE INVENTION

1. Technical Field

The invention relates to an input device, a manufacturing method thereof, and a detection method. More particularly, the invention relates to a touch input device, a manufacturing method thereof, and a touch detecting method.

2. Related Art

With advancements in technology, the input methods for a user of electronic devices have evolved from methods such as keyboard input, mouse input, and key input to touch input. Touch input techniques include capacitive touch techniques, resistive touch techniques, and optical touch techniques. Since the touch input method better matches human intuition, even the eldest or youngest users can achieve good communication with the electronic device through the touch input device.

However, nowadays the touch input devices can only detect the press locations of the user finger or the stylus, but cannot determine the force or the depth of the finger or stylus press. Therefore, these touch input devices are application limited and lack more applicable variety.

On the other hand, the physical keyboards adopted by the desktop and notebook computers nowadays can only sense which key is pressed by the user finger, but the keyboards still cannot determine the force pressing down on the keys. This limits the applicability of the traditional physical keyboards.

SUMMARY OF THE INVENTION

The invention provides a touch input device capable of implementing a press sensation.

The invention provides a touch input device capable of sensing a press depth during a touch operation.

The invention provides a manufacturing method of a touch input device, in which the method is capable of manufacturing a touch input device capable of implementing a press sensation.

The invention provides a touch detecting method capable of detecting a press depth during a touch operation.

In an embodiment of the invention, a touch input device includes a carrying board, a plurality of first electrode pads, and a plurality of conductive lines. The carrying board has a reference plane and defines an x-coordinate direction and a y-coordinate direction both parallel to the reference plane and perpendicular to each other. The carrying board includes a plurality of cantilever portions and a plurality of connecting portions. The connecting portions are respectively connected to the cantilever portions, so that each of the cantilever portions independently sag a distance in a z-coordinate direction relative to the reference plane when pressed by an object, in which the z-coordinate direction is perpendicular to the x-coordinate direction and the y-coordinate direction. The first electrode pads are respectively disposed on the cantilever portions. The first electrode pads sense a capacitance variation due to the object approaching or touching the carrying board in order to determine an x-coordinate value and a y-coordinate value of the object relative to the reference plane. The conductive lines extend on the connecting portions and are respectively connected to the first electrode pads.

According to an embodiment of the invention, the touch input device further includes a plurality of second electrode pads correspondingly disposed below the cantilever portions respectively and separated by a distance away from the cantilever portions. When any one of the cantilever portions is pressed by the object and sags towards the corresponding second electrode pad along the z-coordinate direction, the second electrode pad generates a variation in an electrical signal in respond to the sagging of the corresponding first electrode.

According to an embodiment of the invention, the touch input device further includes a base, in which the carrying board is fixed on the base. The second electrode pads are disposed on the base to correspond to the first electrode pads, and a separation space or a filling of insulated elastic material exists between the first electrode pads and the corresponding second electrode pads.

According to an embodiment of the invention, the touch input device further includes a first interpretation unit, a second interpretation unit, and a processing unit. The first interpretation unit is electrically connected to the conductive lines, and the first interpretation unit determines a location of the object relative to the reference plane due to the object approaching or touching the carrying board, and generates a first signal including the x-coordinate value and the y-coordinate value. The second interpretation unit is electrically connected to the second electrode pads, and the second interpretation unit determines a degree of sag of the cantilever portion being pressed by the object, and generates a second signal including the z-coordinate value. The processing unit determines a three-dimensional touch location of the object according to the first signal and the second signal.

According to an embodiment of the invention, the first electrode pads include a plurality of transmitting electrode pads and a plurality of sensing electrode pads alternately arranged on the carrying board and separated from each other. The conductive lines includes at least one driving signal line connected to the transmitting electrode pads, and at least one signal readout line connected to the sensing electrode pads.

In an embodiment of the invention, a touch input device includes a planar location sensing board, a depth sensing layer, a first interpretation unit, a second interpretation unit, and a processing unit. The planar location sensing board senses a first electrical variation of different locations in the directions parallel to the planar location sensing board due to an object approaching or touching the planar location sensing board. The depth sensing layer is disposed below the planar location sensing board and is separated by a distance from the planar location sensing board. The depth sensing layer senses a second electrical variation corresponding to a degree in which the object presses the planar location sensing board. The first interpretation unit is electrically connected to the planar location sensing board. According to the first electrical variation, the first interpretation unit determines the location in the directions parallel to the planar location sensing board which the object approaches or touches the planar location sensing board, and generates a corresponding first signal. The second interpretation unit is electrically connected to the depth sensing layer, and the second interpretation unit determines the degree the object presses the planar location sensing board according to the second electrical variation, and generates a corresponding second signal. The processing unit determines a three-dimensional touch location of the object according to the first signal and the second signal.

In an embodiment of the invention, a manufacturing method of a touch input device includes: providing a substrate; forming a plurality of first electrode pads and a plurality of conductive lines on the substrate; and performing a substrate patterning process in order to pattern a plurality of cantilever portions and a plurality of connecting portions from the substrate, in which the connecting portions are connected to the cantilever portions.

According to an embodiment of the invention, the step of forming the first electrode pads and conductive lines is before the step of performing the substrate patterning process. Moreover, after the substrate patterning process, the first electrode pads are located on the cantilever portions, and the conductive lines are formed on the connecting portions.

According to an embodiment of the invention, the step of forming the first electrode pads and conductive lines is after the step of performing the substrate patterning process. Moreover, the first electrode pads are formed on the cantilever portions, and the conductive lines are formed on the connecting portions.

According to an embodiment of the invention, the manufacturing method of the touch input device further includes: providing a base; and fixing the substrate on the base.

According to an embodiment of the invention, the manufacturing method of the touch input device further includes: before fixing the substrate on the base, forming a plurality of second electrode pads on the base respectively corresponding to the first electrode pads.

In an embodiment of the invention, a touch detecting method includes: sensing a first electrical variation of different locations in the directions parallel to a reference plane due to an object approaching or touching the reference plane; sensing a second electrical variation due to the object pressing the reference plane; according to the first electrical variation, determining a location in the directions parallel to the reference plane due to the object approaching or touching the reference plane; according to the second electrical variation, determining a degree of the object pressing the reference plane; and according to the location of the object in the directions parallel to the reference plane due to the object approaching or touching the reference plane, and the degree of the object pressing the reference plane, determining a three-dimensional touch location of the object.

According to an embodiment of the invention, the first electrical variation is a capacitance variation, and the second electrical variation is an electric field variation or a capacitance variation.

According to an embodiment of the invention, the touch detecting method further includes using a carrying board to form the reference plane. The carrying board includes a plurality of cantilever portions and a plurality of connecting portions connecting the cantilever portions. At least one electrode pad is respectively disposed on the cantilever portions, in which when the object presses the reference plane, the pressed cantilever portion correspondingly deforms so that a variation is generated on the location of the first electrode pad on the pressed cantilever portion.

According to an embodiment of the invention, the step of sensing the second electrical variation due to the object pressing the reference plane includes: correspondingly disposing at least one second electrode pad below the first electrode pads respectively; and sensing an electrical variation of the second electrode pads, in which when the first electrode pad disposed on the cantilever portion approaches the corresponding second electrode pad due to the object pressing the reference plane, an electrical property of the second electrode pad changes.

In the touch input device according to embodiments of the invention, since the carrying board has the cantilever portions, therefore, when the cantilever portions are pressed downwards, the cantilever portions are curved downwards to allow the user to feel the press sensation. Moreover, in the touch input device according to embodiments of the invention, since the depth sensing layer below the planar location sensing board can sense the second electrical variation corresponding to the degree in which the object presses the planar location sensing board, therefore, the touch input device can detect the press depth of the object. In the manufacturing method of the touch input device according to embodiments of the invention, since a substrate patterning process is used to pattern a plurality of cantilever portions from the substrate, therefore, a touch input device capable of implementing the press sensation can be manufactured. In the touch detecting method according to embodiments of the invention, since the method includes the step of determining the degree in which the object presses the reference plane according to the electrical variation generated when the object presses the reference plane, therefore, the touch detecting method can detect the three-dimensional touch location of the object.

To make the above features and advantages of the invention more comprehensible, several embodiments accompanied with drawings are described in detail as follows.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

DESCRIPTION OF EMBODIMENTS

Figure 1A:
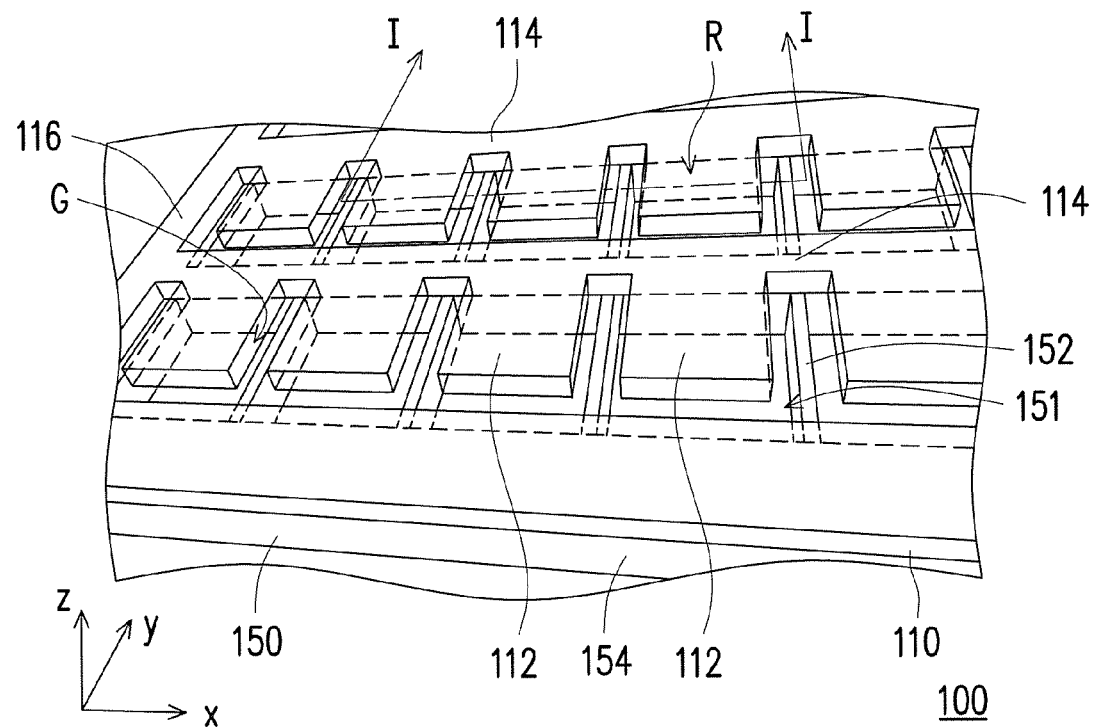
FIG. 1A is a perspective view of a touch input device according to an embodiment of the invention.
Figure 1B:
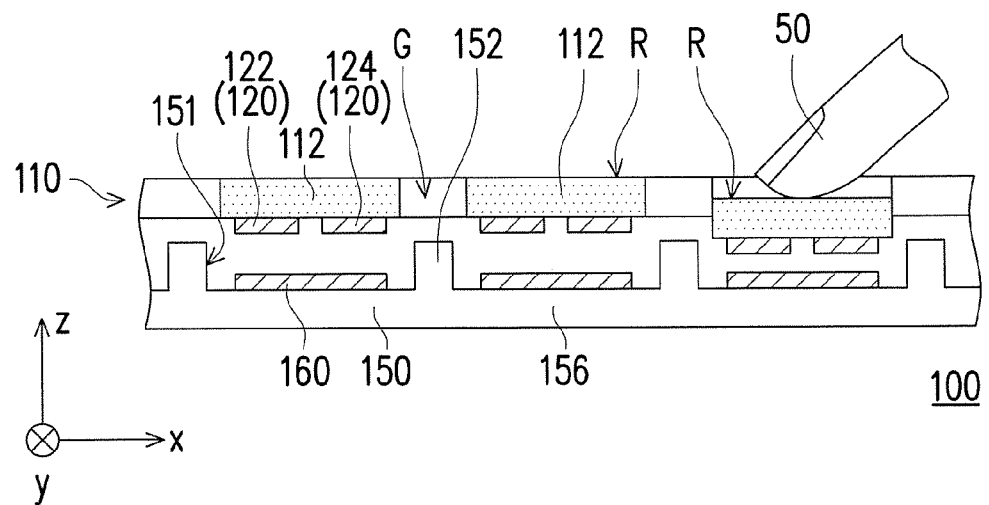
FIG. 1B is a partial cross-sectional view of the touch input device along an I-I line depicted in FIG. 1A.
Figure 1C:
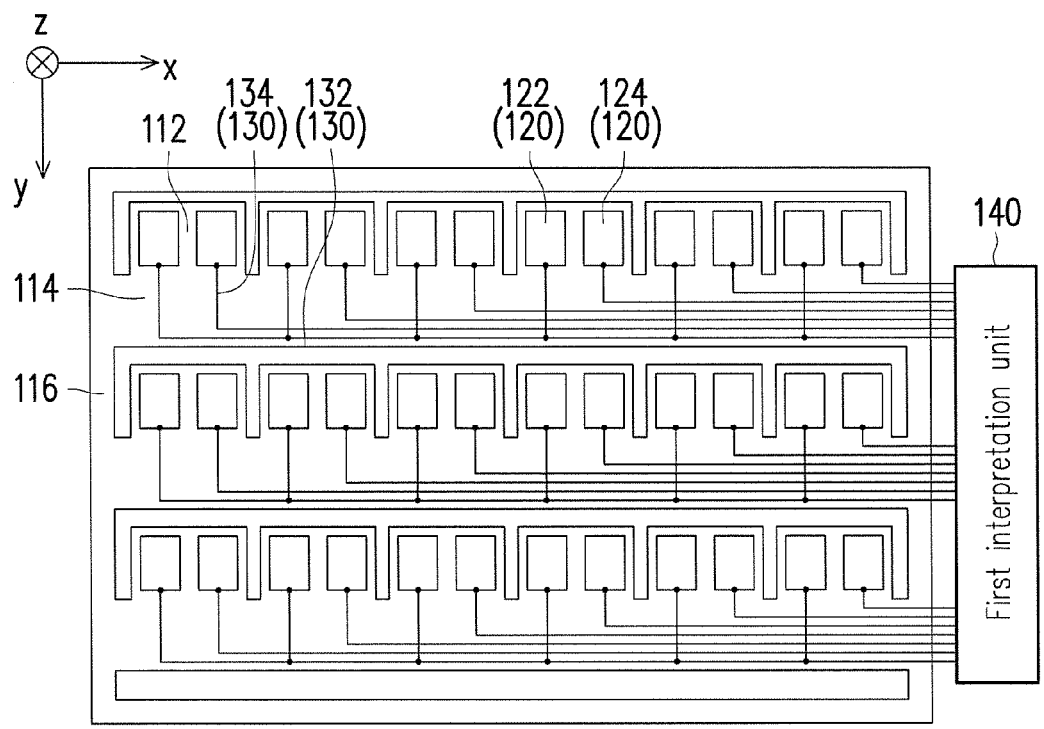
FIG. 1C is a bottom view of the carrying board, the first electrode pads, and the conductive lines depicted in FIG. 1A.
Figure 1D:
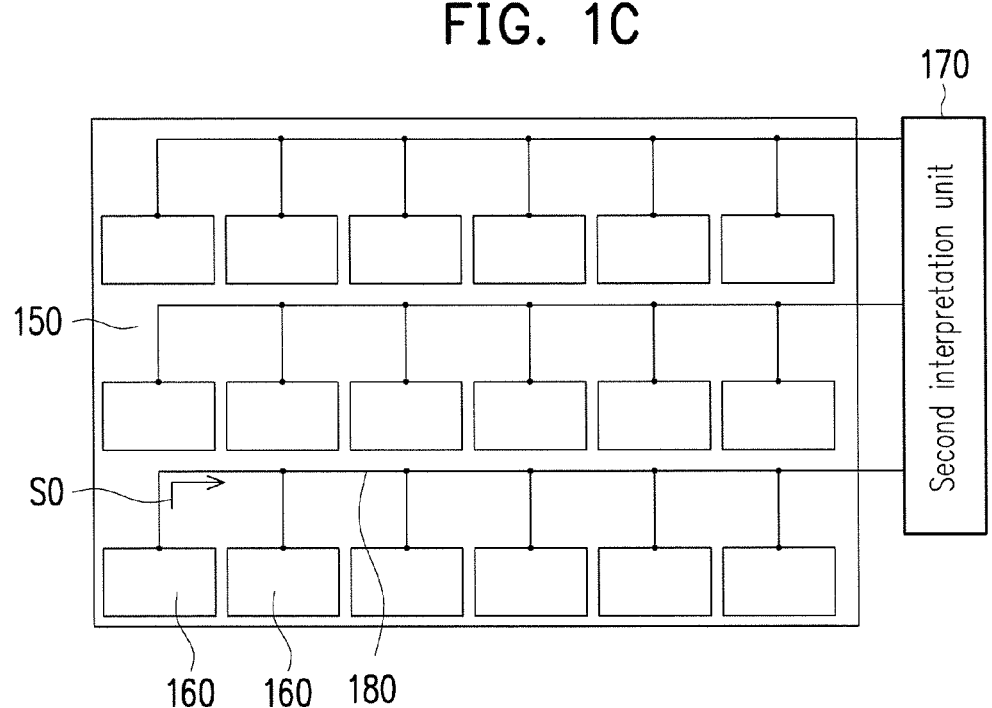
FIG. 1D is a schematic view of the second electrode pads and a circuit connecting the second electrode pads depicted in FIG. 1A.
Figure 1E:
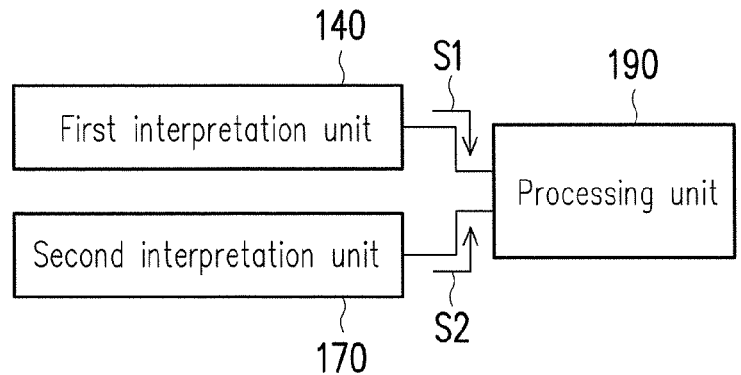
FIG. 1E is a circuit block diagram of the touch input device depicted in FIG. 1A.

FIG. 1A is a perspective view of a touch input device according to an embodiment of the invention. FIG. 1B is a partial cross-sectional view of the touch input device along an I-I line depicted in FIG. 1A. FIG. 1C is a bottom view of the carrying board, the first electrode pads, and the conductive lines depicted in FIG. 1A. FIG. 1D is a schematic view of the second electrode pads and a circuit connecting the second electrode pads depicted in FIG. 1A. FIG. 1E is a circuit block diagram of the touch input device depicted in FIG. 1A. With reference to FIG. 1A to FIG. 1E, a touch input device 100 of the present embodiment includes a carrying board 110, a plurality of first electrode pads 120, and a plurality of conductive lines 130. The carrying board 110 includes a plurality of cantilever portions 112 and a plurality of connecting portions 114, in which the connecting portions 114 are connected to the cantilever portions 112. In the present embodiment, a material of the carrying board 110 may be transparent insulating materials such as glass or plastic, for instance. However, in other embodiments, the material of the carrying board 110 may also be opaque insulating materials.

The first electrode pads 120 are disposed on the cantilever portions 112, and the first electrode pads 120 are configured to sense a capacitance variation due to an object 50 (shown in FIG. 1B) approaching or touching the carrying board 110. In the present embodiment, the object 50 may be a finger of the user, a conductive stylus, or other suitable conductive objects. The conductive lines 130 extend on the connecting portions 114 and are respectively connected to the first electrode pads 120. In the present embodiment, the carrying board 110 has a reference plane R (e.g., formed by a surface of the carrying board 110 facing away from the first electrode pads 120). Moreover, an x-coordinate direction and a y-coordinate direction are defined as both parallel to the reference plane R, and the x-coordinate direction and the y-coordinate direction are perpendicular to each other. The connecting portions 114 respectively connect the cantilever portions 112, so that each of the cantilever portions 112 may independently sag a distance in a z-coordinate direction relative to the reference plane R when pressed by the object 50, in which the z-coordinate direction is perpendicular to the x-coordinate direction and the y-coordinate direction. Furthermore, in the present embodiment, the first electrode pads 120 are respectively disposed on the cantilever portions 112. The first electrode pads 120 are configured to sense a capacitance variation due to the object 50 approaching or touching the carrying board 110 in order to determine an x-coordinate value and a y-coordinate value of the object 50 relative to the reference plane R.

In the present embodiment, the touch input device 100 further includes a first interpretation unit 140 electrically connected to the conductive lines 130. The first interpretation unit 140 is configured to determine a location of the carrying board 110 in directions parallel to the carrying board 110 approached or touched by the object 50, and accordingly generate a corresponding first signal S1. For example, the first interpretation unit 140 determines the location of the carrying board 110 relative to the reference plane R approached or touched by the object 50, and accordingly generate the first signal S1 including the x-coordinate value and the y-coordinate value. In the present embodiment, the first electrode pads 120 and the conductive lines 130 are disposed on a side (e.g. bottom side) of the carrying board 110 facing away from the object 50. Therefore, the object 50 does not directly contact the first electrode pads 120 and the conductive lines 130. In the present embodiment, the first electrode pads 120 include a plurality of transmitting electrode pads 122 and a plurality of sensing electrode pads 124 alternately arranged on the carrying board 110 and separated from each other. The conductive lines 130 include at least one driving signal line 132 (e.g., a plurality of driving signal lines 132 in the present embodiment) connected to the transmitting electrode pads 122, and at least one signal readout line 134 (e.g., a plurality of signal readout lines 134 in the present embodiment) connected to the sensing electrode pads 124. In the present embodiment, in each row of first electrode pads 120, the transmitting electrode pads 122 are connected to a same driving signal line 132, and this driving signal 132 is connected to the first interpretation unit 140. The sensing electrode pads 124, on the other hand, is independently connected to the first interpretation unit 140 respectively through the signal readout lines 134 respectively. However, in other embodiments, each of the transmitting electrode pads 122 may be independently connected to the first interpretation unit 140 through a driving signal line 132 respectively. In other embodiments, each row of sensing electrode pads 124 may be commonly connected to a same signal readout line 134 respectively, and each row of transmitting electrode pads 122 may be commonly connected to a same driving signal line 132 respectively. In other words, according to a sensitivity requirement and whether a multi-touch function is included, a designer may flexibly design the sensing electrode pads 124 and the transmitting electrode pads 122 to independently connect to the first interpretation unit 140 respectively, or to commonly connect to a same signal readout line 134 and a same driving signal line 132 and then connect to the first erpretation unit 140.

The first interpretation unit 140 may respectively transmit a plurality of driving signals to the transmitting electrode pads 122, and respectively receive the sensing signals from the sensing electrode pads 124 through the signal readout lines 134. When the carrying board 110 is approached or touched by the object 50, a mutual capacitance value between the sensing electrode pads 124 near the object 50 and the neighboring transmitting electrode pads 122 changes, so that the sensing signals generated by the sensing electrode pads 124 are varied. Therefore, the first interpretation unit 140 can determine a location which the object 50 approaches or touches according to the sensing signals transmitted by the sensing electrode pads 124. That is, a location parallel to a direction of the carrying board 110, such as an (x, y) coordinate location on the x-direction and the y-direction. In FIGS. 1A to 1D, the x-direction, y-direction, and z-direction are perpendicular to each other, and the z-direction is perpendicular to the carrying board 110. In other words, the carrying board 110, the first electrode pads 120, and the conductive lines 130 form a capacitive touch panel, which may be also known as a planar location sensing board. However, in other embodiments, each of the first electrode pads 120 may include a single electrode pad. Moreover, each of the single electrode pads may independently connect to the first interpretation unit 140 through a conductive line 130 respectively. Alternatively, each of the single electrode pads connected by the conductive lines 130 may be commonly connected to a signal line and then electrically connected to the first interpretation unit 140. That is, the first electrode pads 120 in this single electrode pad mode sense a self-capacitance variation generated due to the object approaching or touching the carrying board 110. In other words, the planar location sensing board senses a first electrical variation of different locations in the directions parallel to the planar location sensing board (i.e., directions parallel to the xy plane) due to the object 50 approaching or touching the planar location sensing board, in which the first electrical variation may be a capacitance variation, for instance. Moreover, the first interpretation unit 140 is electrically connected to the planar location sensing board. According to the first electrical variation, the first interpretation unit 140 determines the location in the directions parallel to the planar location sensing board which the object 50 approaches or touches the planar location sensing board, and generates a corresponding first signal S1.

In the present embodiment, the first interpretation unit 140 may include an integrator, an analog-to-digital (A/D) converter, and a processor. The integrator may convert a sensing signal from the signal readout lines 134 into an analog voltage signal. The A/D converter then converts the analog voltage signal into a digital voltage signal. According to the digital voltage signals, the processor then calculates the location which the object 50 touches or approaches the carrying board 110, such as by calculating a touch or approached (x, y) coordinate, for example. In the present embodiment, the first interpretation unit 140 may be implemented by an integrated circuit, for instance.

In the touch input device 100 of the present embodiment, since the carrying board 110 has the cantilever portions 112, therefore, when the cantilever portions 112 are pressed downwards, the cantilever portions 112 are curved downwards to allow the user to experience a press sensation. Accordingly, a touch input device with press sensation can be implemented. Although the present embodiment used a cantilever model to exemplify the cantilever portions 112 in the figures, the invention is not limited thereto. The scope of the cantilever portions 112 in the invention is defined as any structure capable of partial deformation when pressed by an external force and having a flexible restoration force for returning to an original state after the external force is removed. In the present embodiment, a transmitting electrode pad 122 and a sensing electrode pad 124 are disposed on each of the cantilever portions 112. Therefore, the first interpretation unit 140 can determine which cantilever portion 112 the object 50 approached, touched, or pressed. Accordingly, the touch input device 100 may be used as a physical keyboard, where each of the cantilever portions 122 may serve as a key on the physical keyboard. Moreover, letters, symbols, or characters may be printed on a surface of the cantilever portions 112 (e.g., on a surface facing away from the first electrode pads 120, or on a surface facing towards the first electrode pads 120), to allow the user to recognize the key function represented by the cantilever portions 112. However, in other embodiments, multiple pairs of transmitting electrode pads 122 and sensing electrode pads 124 may be disposed on each of the cantilever portions 112, or each of the cantilever portions 112 may include a plurality of single electrode pads.

In the present embodiment, the transmitting electrode pads 122 and sensing electrode pads 124 are disposed in parallel, such as disposed on a same plane that is parallel to the xy plane. However, in other embodiments, the transmitting electrode pads 122 and sensing electrode pads 124 may also be disposed to be vertical, such as disposed along the z-direction. Moreover, an insulator layer may be disposed between the transmitting electrode pads 122 and sensing electrode pads 124 to separate the transmitting electrode pads 122 and sensing electrode pads 124.

In the present embodiment, the touch input device 100 further includes a base 150, and the carrying board 110 further includes an outer frame 116. The cantilever portions 112 are fixed on the outer frame 116 through the connecting portions 114, and the outer frame 116 is fixed on the base 150. For example, the outer frame 116 may be bonded on the base 150 by an adhesive or a rectangular-ring-shaped tape. In the present embodiment, the base 150 has a grating structure 152. The grating structure 152 has a plurality of openings 151 correspondingly located below the cantilever portions 112 respectively. When the user looks at a space G between two neighboring cantilever portions 112, the grating structure 152 allows the user to not perceive the area underneath as hollow, so that the cantilever portions 112 move in the openings 151 when being pressed. However, in other embodiments, the base 150 may not include the grating structure 152, such that the base 150 is formed by a flat base plate 156 and a frame 154.

In the present embodiment, the touch input device 100 further includes a plurality of second electrode pads 160 correspondingly disposed below the cantilever portions 112 respectively and separated by a distance away from the cantilever portions 112. In the present embodiment, the second electrode pads 160 are disposed on the base 150 and respectively correspond to the first electrode pads 120 above. Moreover, a separation space or a filling of insulated elastic material exists between the first electrode pads 120 and the corresponding second electrode pads 160. The separation space is depicted in FIG. 1B as an illustrative example. When any one of the cantilever portions 112 is pressed by the object 50 and sags towards the corresponding second electrode pad 160 along the z-coordinate direction, the second electrode pad 160 generates a variation in an electrical signal S0 in respond to the sagging of the corresponding first electrode 120.

In specifics, when the cantilever portions 112 are pressed so that the first electrode pads 120 approach the second electrode pads 160, a magnitude of an electric field formed on the second electrode pads 160 by the electric charge on the first electrode pads 120 is increased. Accordingly, the second electrode pads 160 generate changes to the current signals or voltage signals. In other words, the electrical signal S0 may be a current signal or a voltage signal. Alternatively, when the cantilever portions 112 are pressed so that the first electrode pads 120 approach the second electrode pads, a capacitance (e.g. self-capacitance) corresponding to the second electrode pads 160 changes, such that the electrical signal S0 (e.g. current signal or voltage signal) generated by the second electrode pads 160 changes.

In the present embodiment, the touch input device 100 further includes a second interpretation unit 170 electrically connected to the second electrode pads 160. The second interpretation unit 170 determines a sag level of the cantilever portions 112 pressed by the object 50, and accordingly generate a corresponding second signal S2, such as a second signal S2 including a z-coordinate value, for example. To be specific, in the present embodiment, the second electrode pads 160 are connected to the second interpretation unit 170 by a plurality of conductive lines 180, so as to transmit the electrical signal S0 generated by the second electrode pads 160 to the second interpretation unit 170. Moreover, the second interpretation unit 170 may drive all of the second electrode pads 160 with a single driving signal, thereby simplifying the framework of the second interpretation unit 170. For example, the second electrode pads 160 may be electrically connected to a same driving signal line, and the second interpretation unit 170 transmits the driving signal to the second electrode pads 160 through the driving signal line. However, in other embodiments, different rows of the second electrode pads 160 may be connected to the second interpretation unit 170 through a plurality of different driving signal lines, respectively. Alternatively, different second electrode pads 160 may be connected to the second interpretation unit 170 through different driving signal lines, respectively.

According to a variation of the electrical signal S0, the second interpretation unit 170 calculates a depth of a press on the cantilever portions 120; that is, a location corresponding to a z-coordinate value of the press is calculated. In the present embodiment, the second interpretation unit 170 may include an integrator, an A/D converter, and a processor. The integrator may convert the signal S0 of the second electrode pads 160 into an analog voltage signal. The A/D converter then converts the analog voltage signal into a digital voltage signal. According to the digital voltage signals, the processor then calculates a depth location of the press by the object 50 on the cantilever portions 112, such as by calculating a location corresponding to a z-coordinate value of the press on the cantilever portions 112, for example. In the present embodiment, the second interpretation unit 170 may be implemented by an integrated circuit, for instance.

In other words, the second electrode pads 160, the conductive lines 180, and the driving signal lines connected with the second electrode pads 160 may form a depth sensing layer disposed below the planar location sensing board, and the depth sensing layer is separated from the planar location sensing board by a distance. The depth sensing layer is configured to sense a second electrical variation corresponding to a degree in which the object 50 presses the planar location sensing board, where the second electrical variation is an electric field variation or a capacitance variation. Moreover, the second interpretation unit 170 is electrically connected to the depth sensing layer, and the second interpretation unit 170 determines the degree the object 50 presses the planar location sensing board according to the second electrical variation, and accordingly generates a corresponding second signal S2. In other words, the first electrode pads 120 senses the first electrical variation generated when the object 50 approaches or touches the planar location sensing board, and the second electrode pads 160 senses the second electrical variation generated with the corresponding first electrode pads 120 when the object 50 presses the cantilever portions 112 above the planar location sensing board.

In the present embodiment, the touch input device 100 further includes a processing unit 190 determining a three-dimensional touch location of the object 50 according to the first signal S1 and the second signal S2. For example, the first interpretation unit 140 transmits the first signal S1 representing an (x, y) coordinate value to the processing unit 190, and second interpretation unit 170 transmits the second signal S2 representing a z-coordinate value to the processing unit 190. The processing unit 190 may assemble the first signal S1 and the second signal S2 into a three-dimensional touch location which the cantilever portions 112 have been pressed to each time; that is, a (x, y, z) coordinate value. Since the touch input device 100 of the present embodiment can determine the three-dimensional touch location that the touch input device 100 has been pressed to, the applicability of the touch input device 100 is enhanced. For example, the z-coordinate value may correspond to the force of the press. Therefore, a software designer may develop application programs which utilize the press force, thereby enhancing the functions and variety of the application programs. In the present embodiment, the processing unit 190 may be implemented by firmware, although the invention is not limited thereto. In other embodiments, the processing unit 190 may also be a digital logic circuit (i.e hardware implemented) or a computer central processor (i.e., software implemented).

Figure 2:
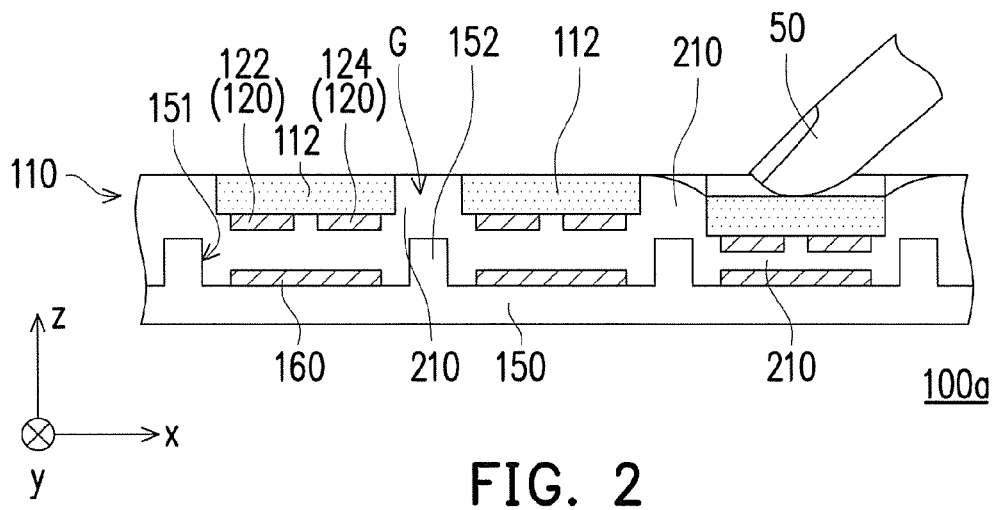
FIG. 2 is a partial cross-sectional view of a touch input device according to another embodiment of the invention.

FIG. 2 is a partial cross-sectional view of a touch input device according to another embodiment of the invention. Referring to FIG. 2, a touch input device 100a of the present embodiment is similar to the touch input device 100 depicted in FIG. 1B, and the difference between these two devices are described below. In the present embodiment, the touch input device 100a further includes an insulating material 210 filling a space (e.g. space G) between every two neighboring cantilever portions 112. Moreover, in the present embodiment, the insulating material 210 further fills between the first electrode pads 120 and the second electrode pads 160, and the insulating material 210 may be an elastic material, for instance. Therefore, when the cantilever portions 112 are pressed, a portion of the insulating material 210 located between the first electrode pads 120 and the second electrode pads 160 is compressed, and the insulating material 210 near the pressed cantilever portions 112 also sags accordingly. The insulating material 210 may be a transparent material, for example, and a refractive index thereof may be close to a refractive index of the carrying board 110, making it difficult for the user to discern the space G. Furthermore, the base 150 may also be formed by a transparent material, and the first electrode pads 120 and the second electrode pads 160 may be formed by a transparent conductive material (e.g. indium tin oxide). Accordingly, the touch input device 100a may be made to be transparent, and suitable for configuration above a display region of a display device, such that the user can operate according to the graphics or content displayed in the display region.

In another embodiment, the insulating material 210 may also be disposed in the space G, but not between the first electrode pads 120 and the second electrode pads 160. In other words, air, gas, liquid, or a spacing may exist between the first electrode pads 120 and the second electrode pads 160. Alternatively, the insulating material 210 may only be disposed between the first electrode pads 120 and the second electrode pads 160, but not in the space G. In other words, air, gas, liquid, or a spacing may exist in the space G. Alternatively, an insulating material disposed in the space G and an insulating material disposed between the first electrode pads 120 and the second electrode pads 160 may be different insulating materials.

Figure 3:
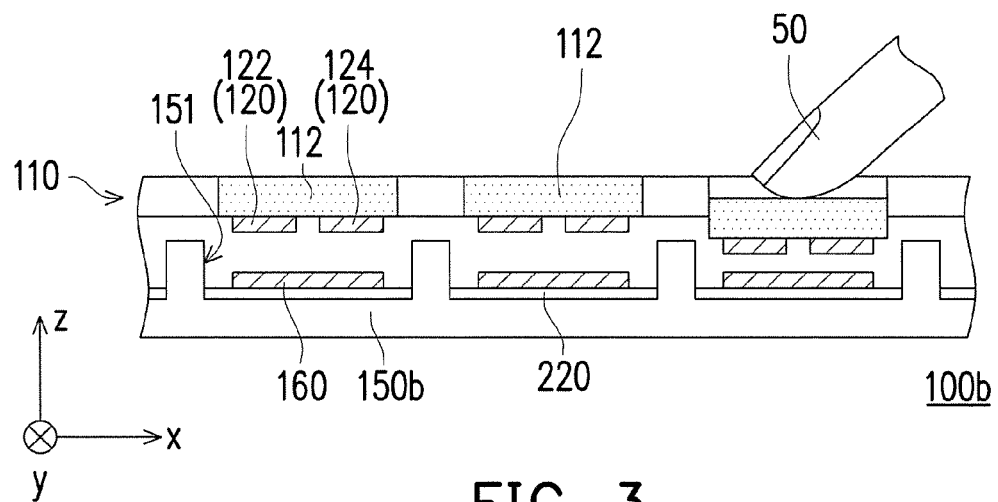
FIG. 3 is a partial cross-sectional view of a touch input device according to another embodiment of the invention.

FIG. 3 is a partial cross-sectional view of a touch input device according to another embodiment of the invention. With reference to FIG. 3, a touch input device 100b of the present embodiment is similar to the touch input device 100 depicted in FIG. 1B, and the difference between these two devices are described below. The touch input device 100b of the present embodiment further includes an insulating layer 220 disposed on a base 150b and located between each of the second electrode pads 160 and the base 150b, in which a material of the base 150b include a metal, for instance. Accordingly, the conductive base 150b does not affect the electrical property of the second electrode pads 160.

Figure 4A:
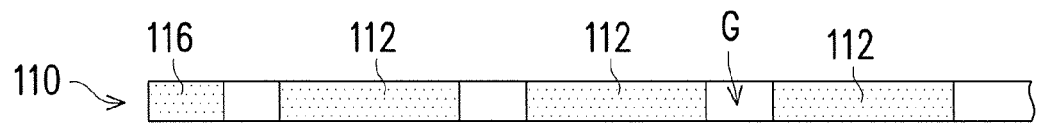
FIGS. 4A-4D are cross-sectional views of a manufacturing method of a touch input device according to an embodiment of the invention.
Figure 4B:
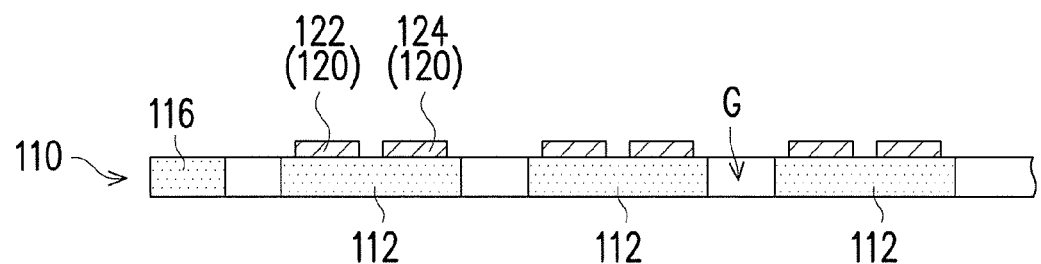

FIGS. 4A-4D are cross-sectional views of a manufacturing method of a touch input device according to an embodiment of the invention. FIG. 5 is a perspective view of the carrying board depicted in FIG. 4A. With reference to FIGS. 4A-4D, a manufacturing method of a touch input device according to the present embodiment may fabricate the touch input device 100 of FIGS. 1A and 1B, or the touch input devices of the other embodiments. The manufacture of the touch input device 100 depicted in FIG. 2 is used as an illustrative example below. The manufacturing method of the touch input device according to the present embodiment includes the following steps. With reference to FIG. 4A, a substrate is provided, in which the substrate may be a glass substrate, a plastic substrate, or substrates of other insulating materials. Thereafter, a substrate patterning process is performed in order to pattern a plurality of cantilever portions 112 and a plurality of connecting portions 114 from the substrate (as shown in FIG. 5) and form the carrying board 110, in which the connecting portions 114 are connected to the cantilever portions 112. In the present embodiment, the substrate patterning process further patterns the outer frame 116 from the substrate. The substrate patterning process may be a physical cutting process (e.g. wheel or knife cutting process or laser cutting process), or a chemical patterning process (e.g. etching process). Thereafter, as shown in FIG. 4B, a plurality of first electrode pads 120 and a plurality of conductive lines 130 (shown in FIG. 1C) are formed on the substrate (e.g. carrying board 110).

In the present embodiment, the step of forming the first electrode pads 120 and conductive lines 130 is after the step of performing the substrate patterning process. Moreover, the first electrode pads 120 are formed on the cantilever portions 112, and the conductive lines 130 are formed on the connecting portions 114.

Figure 4C:
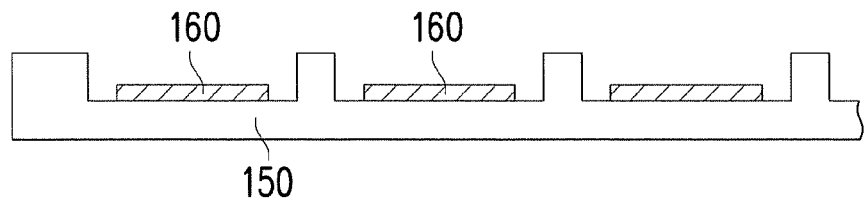
Figure 5:
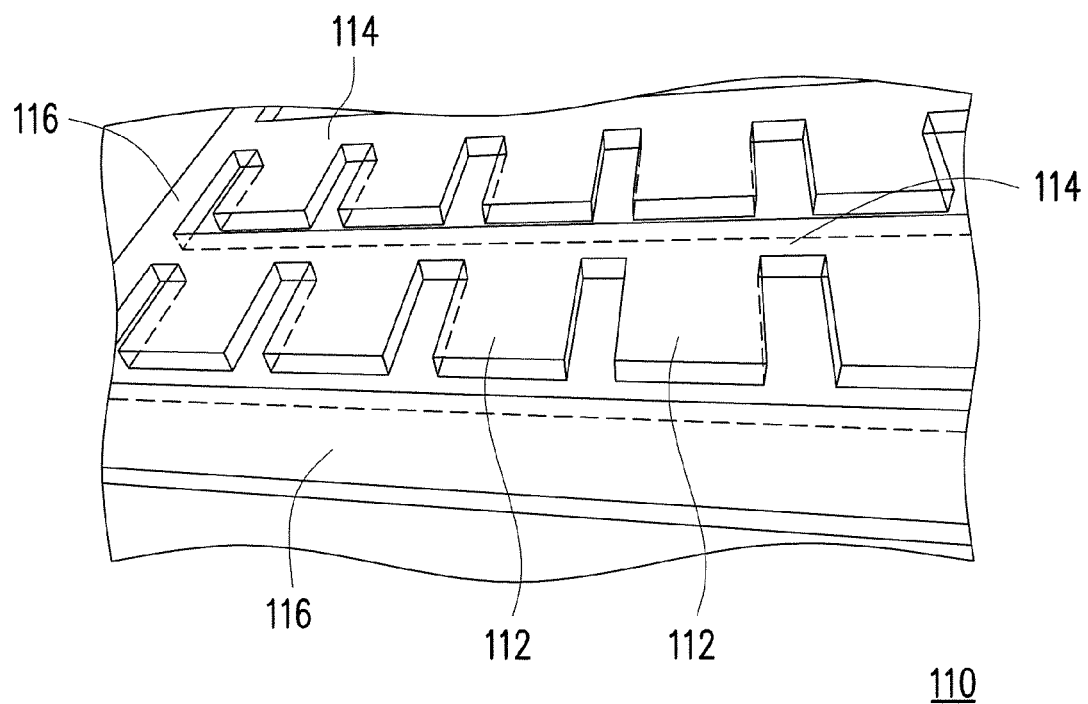
FIG. 5 is a perspective view of the carrying board depicted in FIG. 4A.

As shown in FIG. 4C, the base 150 is then provided. Thereafter, a plurality of second electrode pads 160, the conductive lines 180 of the embodiment depicted in FIG. 1D, and the driving signal lines are formed on the base 150. In another embodiment, when the material of the base 150b (shown in FIG. 3) is a metal, the insulating layer 220 may be first formed on the base 150b, and then the second electrode pads 160, the conductive lines 180, and the driving signal lines are formed on the insulating layer 220.

Figure 4D:
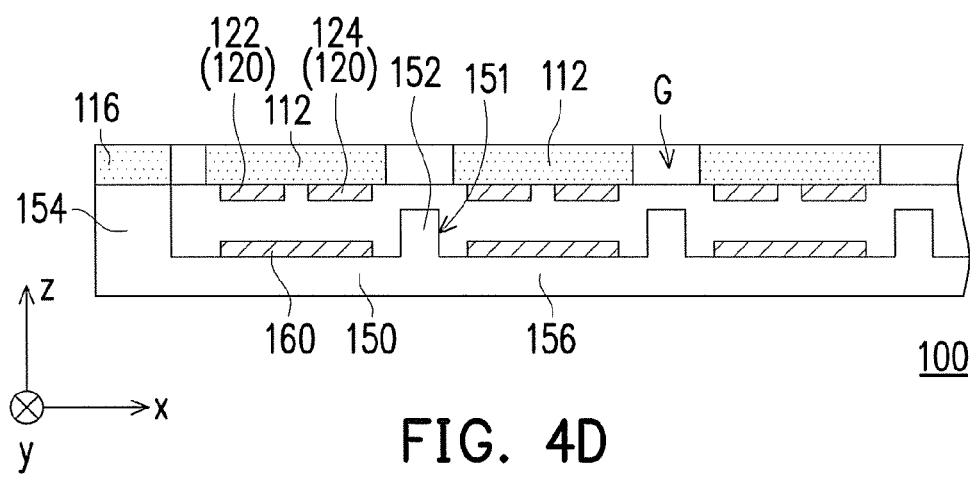

As shown in FIG. 4D, the substrate (e.g. carrying board 110) is fixed on the base 150. In the present embodiment, the step of fixing the substrate (e.g. carrying board 110) on the base 150 includes separating all the first electrode pads 120 and the second electrode pads 160 so they correspond to each other. Alternatively, as shown in the embodiment of FIG. 1A, the cantilever portions 112 are respectively aligned with the openings 151 of the grating structure 152, and then the outer frame 116 is bonded on the base 150, such as by using an adhesive or a rectangular-ring-shaped tape to bond the outer frame 116 on the frame 154 of the base 150. Up to this point, the fabrication of the touch input device 100 is completed. The manufacturing method of the touch input device in the present embodiment can fabricate the touch input device 100 or the touch input devices in other embodiments that are capable of implementing the press sensation.

Figure 6:
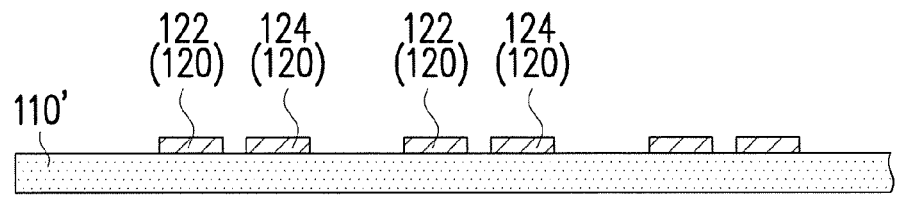
FIG. 6 is a cross-sectional view of a step of a manufacturing method of a touch input device according to another embodiment of the invention.

FIG. 6 is a cross-sectional view of a step of a manufacturing method of a touch input device according to another embodiment of the invention. With reference to FIGS. 4A-4D and FIG. 6, a manufacturing method of a touch input device of the present embodiment is similar to the manufacturing method of the touch input device depicted in FIGS. 4A-4D, and the difference between these two methods are described below. In the present embodiment, as shown in FIG. 6, the step of forming the first electrode pads 120 and the conductive lines 130 (shown in FIG. 1C) on a substrate 110' is before the step of performing the substrate patterning process. In other words, the substrate patterning process is performed after forming the first electrode pads 120 and the conductive lines 130 (shown in FIG. 1C) on the planar substrate 110', so as to form the carrying board 110 depicted in FIG. 4B. Thereafter, the steps depicted in FIGS. 4C and 4D are likewise performed to complete the fabrication of the touch input device 100. Furthermore, in the present embodiment, after the substrate patterning process is performed, the first electrode pads 120 are located on the cantilever portions 112, and the conductive lines 130 are located on the connecting portions 114 (shown in FIG. 1C).

Figure 7:
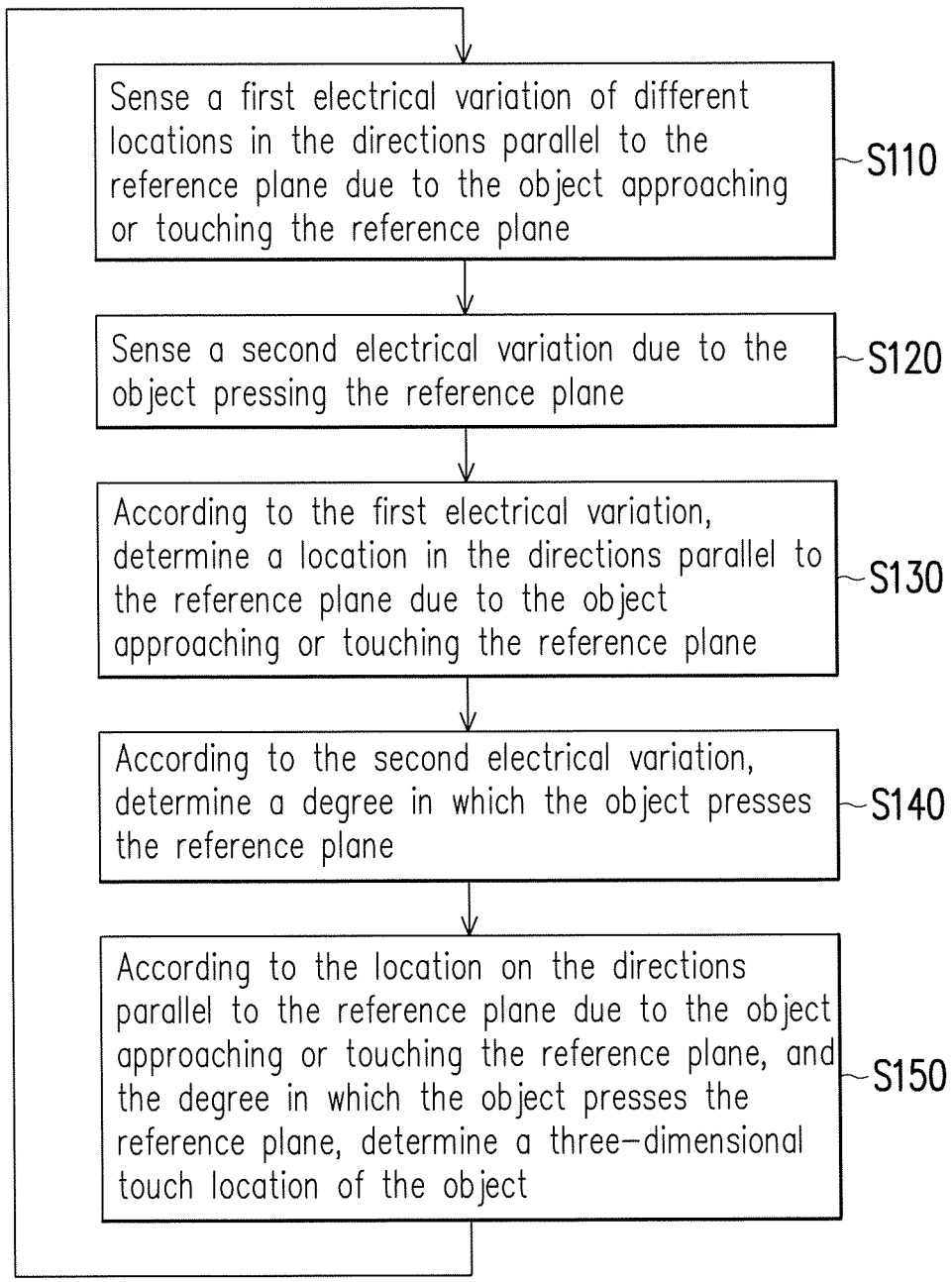
FIG. 7 is a flow diagram illustrating a touch detecting method according to an embodiment of the invention.

FIG. 7 is a flow diagram illustrating a touch detecting method according to an embodiment of the invention. With reference to FIGS. 1B-1D and FIG. 7, a touch detecting method in the present embodiment may be executed by the touch input device 100 or the touch input devices of the other embodiments. The touch input device 100 is used as an illustrative example below. The touch detecting method includes Steps S110, S120, S130, and S140. In Step S110, a first electrical variation of different locations in the directions parallel to the reference plane R (e.g., in the directions parallel to the xy plane) is sensed due to the object 50 approaching or touching the reference plane R. In other words, the carrying board 110 may be used to form the reference plane R. Moreover, when the object 50 presses the reference plane R, the pressed cantilever portions correspondingly deform (e.g. become curved), such that the locations of the electrode pads disposed thereon are changed (e.g. the locations sagged). The detailed description of the first electrical variation may be referenced to the embodiment depicted by FIGS. 1A-1D. In the present embodiment, Step S110 may be implemented by the planar location sensing board (e.g., including the carrying board 110, the first electrode pads 120, and the conductive lines 130), the details of which may be referenced to the afore-described embodiments and not repeated herein.

In Step S120, a second electrical variation due to the object 50 pressing the reference plane R is sensed. Step S120 may include correspondingly disposing at least one second electrode pad 160 (e.g., a plurality of second electrode pads 160 in the present embodiment) respectively below the first electrode pads 120, and sensing the electrical variations of the second electrode pads 160. When the object 50 presses the reference plane R, such that the first electrode pads 120 disposed on the pressed cantilever portions 112 approach the corresponding second electrode pads 160, the electrical properties of the second electrode pads 160 change. In the present embodiment, Step S120 may be implemented by the depth sensing layer (e.g., including the second electrode pads 160, the driving signal lines, and the conductive lines 180 connected to the second electrode pads 160), the details of which may be referenced to the afore-described embodiments and not repeated herein.

In Step S130, according to the first electrical variation, a location (e.g. (x, y) coordinate value) in the directions parallel to the reference plane R due to the object 50 approaching or touching the reference plane R is determined. Step S130 may be executed by the first interpretation unit 140, the details of which may be referenced to the afore-described embodiments and not repeated herein.

In Step S140, according to the second electrical variation, a degree in which the object 50 presses the reference plane R is determined (e.g., by obtaining the z-coordinate value). Step S140 may be executed by the second interpretation unit 170, the details of which may be referenced to the afore-described embodiments and not repeated herein.

The afore-described Steps S110-S140 may be executed in any suitable sequence or executed simultaneously. Moreover, the sub-steps of the afore-described Steps S110-S140 may also be executed in any suitable sequence or executed simultaneously. According to the results obtained from executing Steps S110-S140, Step S150 may be subsequently executed. In Step S150, according to the location (e.g. (x, y) coordinate value) in the directions parallel to the reference plane R due to the object 50 approaching or touching the reference plane R, and the degree in which the object 50 presses the reference plane R (e.g. z-coordinate value), a three-dimensional touch location of the object 50 (e.g. (x, y, z) coordinate value) is determined. Step S150 may be executed by the processing unit 190, the details of which may be referenced to the afore-described embodiments and not repeated herein. In addition, Steps S110-S150 may be continuously and repeatedly executed, such that real-time touch sensing is achieved.

In the touch detecting method of the present embodiment, since the method includes the step of determining the degree in which the object 50 presses the reference plane R according to the electrical variation due to the object 50 pressing the reference plane R, therefore, the touch detecting method can detect the three-dimensional touch location of the object 50, thereby enhancing the touch function and its applicability.

In view of the foregoing, in the touch input device according to embodiments of the invention, since the carrying board has the cantilever portions, therefore, when the cantilever portions are pressed downwards, the cantilever portions 112 are curved downwards to allow the user to feel the press sensation. Moreover, in the touch input device according to embodiments of the invention, since the depth sensing layer below the planar location sensing board can sense the second electrical variation corresponding to the degree in which the object presses the planar location sensing board, therefore, the touch input device can detect the press depth of the object. In the manufacturing method of the touch input device according to embodiments of the invention, since a substrate patterning process is used to pattern a plurality of cantilever portions from the substrate, therefore, a touch input device capable of implementing the press sensation can be manufactured. In the touch detecting method according to embodiments of the invention, since the method includes the step of determining the degree in which the object presses the reference plane according to the electrical variation generated when the object presses the reference plane, therefore, the touch detecting method can detect the three-dimensional touch location of the object.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A touch input device, comprising:
   a carrying board having a reference plane, the carrying board defining an x-coordinate direction and a y-coordinate direction both parallel to the reference plane and perpendicular to each other, the carrying board comprising:
     a plurality of cantilever portions; and
     a plurality of connecting portions respectively connecting the cantilever portions, so that each of the cantilever portions independently sags a distance in a z-coordinate direction relative to the reference plane when pressed by an object, wherein the z-coordinate direction is perpendicular to the x-coordinate direction and the y-coordinate direction;
   a plurality of first electrode pads respectively disposed on the cantilever portions, configured to sense a capacitance variation due to the object approaching or touching the carrying board in order to determine an x-coordinate value and a y-coordinate value of the object relative to the reference plane; and
   a plurality of conductive lines extending on the connecting portions and respectively connected to the first electrode pads.

2. The touch input device according to claim 1, further comprising a base, wherein the carrying board further comprises an outer frame, the cantilever portions are fixed on the outer frame through the connecting portions, and the outer frame is fixed on the base.

3. The touch input device according to claim 2, wherein the base has a grating structure having a plurality of openings correspondingly located below the cantilever portions respectively.

4. The touch input device according to claim 1, further comprising a plurality of second electrode pads correspondingly disposed below the cantilever portions respectively and separated by a distance away from the cantilever portions, wherein when any one of the cantilever portions is pressed by the object and sags towards the corresponding second electrode pad along the z-coordinate direction, the second electrode pad generates a variation in an electrical signal in respond to the sagging of the corresponding first electrode.

5. The touch input device according to claim 4, further comprising a base, wherein the carrying board is fixed on the base, the second electrode pads are disposed on the base to correspond to the first electrode pads, and a separation space or a filling of insulated elastic material exists between the first electrode pads and the corresponding second electrode pads.

6. The touch input device according to claim 5, further comprising an insulating layer disposed on a base and located between each of the second electrode pads and the base, wherein a material of the base comprises a metal.

7. The touch input device according to claim 4, further comprising:
   a first interpretation unit electrically connected to the conductive lines, the first interpretation unit determining a location of the object relative to the reference plane due to the object approaching or touching the carrying board, and generating a first signal comprising the x-coordinate value and the y-coordinate value;
   a second interpretation unit electrically connected to the second electrode pads, the second interpretation unit determining a degree in which the object presses the cantilever portions, and generating a second signal comprising the z-coordinate value; and
   a processing unit determining a three-dimensional touch location of the object according to the first signal and the second signal.

8. The touch input device according to claim 1, further comprising an insulating material filling a space between every two neighboring cantilever portions.

9. The touch input device according to claim 1, wherein the first electrode pads comprise a plurality of transmitting electrode pads and a plurality of sensing electrode pads alternately arranged on the carrying board and separated from each other, the conductive lines comprising at least one driving signal line connected to the transmitting electrode pads, and at least one signal readout line connected to the sensing electrode pads.

10. The touch input device according to claim 9, wherein the conductive lines comprise a plurality of driving signal lines each independently connected to the transmitting electrode pads, or a single driving single line commonly connected to a plurality of the transmitting electrode pads, and the conductive lines comprise a plurality of signal readout lines each independently connected to the sensing electrode pads, or a single signal readout line commonly connected to a plurality of the sensing electrode pads.

11. The touch input device according to claim 1, wherein the first electrode pads comprise a plurality of independent single electrode pads, and each of the single electrode pads is respectively connected to one of the conductive lines, or a plurality of single electrode pads are commonly connected to one of the conductive lines.

* * * * *